(12) United States Patent
Johri et al.

(10) Patent No.: US 7,990,945 B1
(45) Date of Patent: Aug. 2, 2011

(54) METHOD AND APPARATUS FOR PROVISIONING A LABEL SWITCHED PATH ACROSS TWO OR MORE NETWORKS

(75) Inventors: Pravin K. Johri, Aberdeen, NJ (US); Sanja Durinovic-Johri, Aberdeen, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 821 days.

(21) Appl. No.: 11/225,906

(22) Filed: Sep. 14, 2005

(51) Int. Cl.
*H04L 12/26* (2006.01)

(52) U.S. Cl. .......................... 370/351; 370/392; 370/400

(58) Field of Classification Search .................. None
See application file for complete search history.

(56) References Cited

U.S. PATENT DOCUMENTS

| | | | |
|---|---|---|---|
| 6,714,544 B1 | 3/2004 | Bosloy et al. | |
| 6,862,622 B2 | 3/2005 | Jorgensen | |
| 2004/0004955 A1* | 1/2004 | Lewis | 370/351 |
| 2004/0095922 A1* | 5/2004 | Sasagawa | 370/351 |
| 2004/0213228 A1* | 10/2004 | Tingle et al. | 370/389 |
| 2005/0097203 A1* | 5/2005 | Unbehagen et al. | 709/223 |
| 2005/0141504 A1* | 6/2005 | Rembert et al. | 370/392 |
| 2005/0180431 A1* | 8/2005 | Kinoshita et al. | 370/397 |
| 2006/0171320 A1* | 8/2006 | Vasseur et al. | 370/238 |
| 2007/0008895 A1* | 1/2007 | Perkins et al. | 370/244 |

* cited by examiner

*Primary Examiner* — Pankaj Kumar
*Assistant Examiner* — Hicham B Foud

(57) ABSTRACT

Disclosed is a method and apparatus for provisioning a label switched path (LSP) between two endpoints executing a first set of MPLS functions. The method and apparatus associates a first node with the first endpoint and a second node with the second endpoint. The first node is designated as the source. Both the first and second nodes execute a second set of MPLS functions, wherein the second set of MPLS functions include the first set of MPLS functions and additional MPLS functions. As the source, the first node provisions a first MPLS path (i.e., LSP) between itself and the first endpoint. The first node then provisions a second MPLS path (i.e., LSP) between the first node and the second node. The first node then transmits a message to the second node instructing the second node to provision a third MPLS path between the second node and the second endpoint. The three MPLS paths are bridged at the first and second nodes to complete the LSP between the two endpoints.

16 Claims, 3 Drawing Sheets

METHOD AND APPARATUS FOR PROVISIONING A LABEL SWITCHED PATH ACROSS TWO OR MORE NETWORKS

BACKGROUND OF THE INVENTION

The present invention relates generally to networks, and more particularly to provisioning a label switched path (LSP) across two or more networks.

In order to provide customers with the ability to communicate between two independent locations, a Communications Network Provider or an Internet Service Provider (ISP) typically has to combine multiple circuit segments of one or more networks into a single communication path. In more detail, each circuit segment may only span a portion of the single communication path. Sometimes, the devices (switches, routers) in the different networks can communicate with each other in order to set up the entire communication path. In other instances, however, devices in different segments of different networks cannot communicate with each other because either they communicate using different protocols or one node cannot handle the complexity of the communication protocol used by another node.

One communication protocol often used to facilitate communication within a network and across networks is the Multiprotocol Label Switching (MPLS) protocol. MPLS enables the provisioning of virtual circuits, or label switched paths (LSPs), across IP networks. Variants of MPLS or similar protocols have also been used in Optical and ATM networks as well. In particular, MPLS involves setting up a specific path for a given sequence of packets. The path is identified by a label in each packet. Routers use the label to direct a packet to its next hop until it reaches its destination. This label saves a router the time conventionally needed to look up the destination IP address in each packet and forward the packet based on this IP address. The label is swapped with a different label at each hop. Often, multiple labels are used. Multiple paths can be defined between two endpoints to provide load balancing and backup service in the event of a line failure. LSPs are set up for two purposes. The first is to allow network routers to forward packets to each other. The second is to directly connect two customer locations across the network.

An MPLS network includes several network elements. These network elements include Label Edge Routers (LERs) and Label Switching Routers (LSRs). Nodes belonging to other networks communicating with an MPLS network communicate with Label Edge Routers (LERs). LERs are devices that connect to other networks communicating with an MPLS network, determine routes, and add or remove labels from packets. LSRs are devices that switch packets and add or remove labels from packets.

In more detail, when packets enter an MPLS-based network, Label Edge Routers (LERs) provide the packets with a label (i.e., an identifier) and sometimes even with a stack of labels. Each successive router that encounters this packet will "pop" (remove) one or more labels from one end of the stack of labels. The labels contain an index into a routing table stored by routers. The index specifies the next hop for the packet and any labels that need to be "pushed" (added) on the stack of labels. The label carries the information that determines which path a packet should take.

Once the LERs determine how to route packets with the same (group of) destination IP addresses, they set up LSPs for each of the routes and associate labels with each hop of the LSP. Paths can be engineered using manual or automatic techniques. MPLS supports explicit routing, in which network engineers define specific paths across a network for specific types of traffic. MPLS also supports constraint-based routing, in Which the path is selected dynamically. Constraint-based routing involves programming traffic-engineering parameters into the network.

The traditional way to set up an LSP is to select one endpoint node (i.e., endpoint) of the LSP as the source and the other endpoint of the LSP as the destination. The source node (also referred to below as source router) typically determines the route of the LSP and then communicates with each router in the route to set up the LSP. These communications involve complex routing and signaling protocols, such as the MPLS suite of protocols.

MPLS processing (e.g., the labeling of the packets, the determination of an LSP for different packets, etc.) requires processing capabilities beyond a limited set of capabilities. In order for an endpoint node to perform the functions (e.g., the provisioning of an LSP) of a source, the endpoint node has to be capable of executing the full suite of MPLS and/or network inter-working protocols. This, however, is often not the case. The devices on customer premises typically have limited capabilities. These devices often do not have the power to execute a full complement of routing, signaling, and inter-working protocols. Typically, the ability to run a full routing protocol in order to exchange network topology information and to calculate a path for an LSP is not provided in these devices. The set of signaling functions may be reduced to accepting and completing LSP set up requests that are originated by another device.

For example, it may be desirable to share data between two office locations. Routers at the customer premises (i.e., each office location), however, are typically not capable of communicating using the full suite of MPLS. These routers (at the customer premises) can frequently communicate with the more complex network devices, but these communications can only utilize a limited set of functions due to the customer premises equipment's limited capabilities.

Thus, a new way of setting up an LSP is needed using customer premises equipment capable of executing only a limited set of MPLS functions.

BRIEF SUMMARY OF THE INVENTION

The present invention provides for an improved method and apparatus for provisioning a label switched path between a first endpoint and second endpoint of a network. The two endpoints execute a first set of MPLS functions. Thus, to set up a label switched path between the two endpoints, a node associated with one of the two endpoints is designated as a source node to provision the LSP between the two endpoints. The source node can execute a second set of MPLS functions. The second set of MPLS functions include the first set of MPLS functions and additional MPLS functions.

In accordance with the present invention, the system associates a first node with the first endpoint and a second node with the second endpoint. The first node is designated as the source. Both the first and second nodes execute a second set of MPLS functions, wherein the second set of MPLS functions comprise the first set of MPLS functions and additional MPLS functions. As the source, the first node provisions a first MPLS path (i.e., LSP) between itself and the first endpoint. The first node then provisions a second MPLS path (i.e., LSP) between the first node and the second node. The first node then transmits a message to the second node instructing the second node to provision a third MPLS path between the second node and the second endpoint.

The first node also bridges the first MPLS path and the second MPLS path so that data can flow between the two MPLS paths. The message sent to the second node can also request the second node to bridge the third MPLS path and the second MPLS path so that data can flow between these two MPLS paths.

Similar to the first node being designated as a source, the second node may be designated as a destination node after the second node is associated with the second endpoint. In one embodiment, a Network Management System (NMS) transmits the message(s) to the source and/or destination nodes.

The message sent to the source for provisioning the LSP between the two endpoints may have several identifiers. For example, the message may include a first identifier for the first endpoint and a second identifier for the second endpoint. The message may also include a third identifier for the source node. The message may include an identifier for the LSP being provisioned. The message transmitted from the source to the destination node may include a request to set up an LSP as well as a request to bridge two LSPs together.

These and other advantages of the invention will be apparent to those of ordinary skill in the art by reference to the following detailed description and the accompanying drawings.

DETAILED DESCRIPTION

The present invention enables the provisioning of a label switched path (LSP) across two or more MPLS networks. Despite endpoints of an LSP being routers (or switches) that are incapable of communicating using the full suite of MPLS and executing network inter-working protocols, the present invention enables the provisioning of an LSP to connect the two endpoints at remote customer locations.

Figure 1:
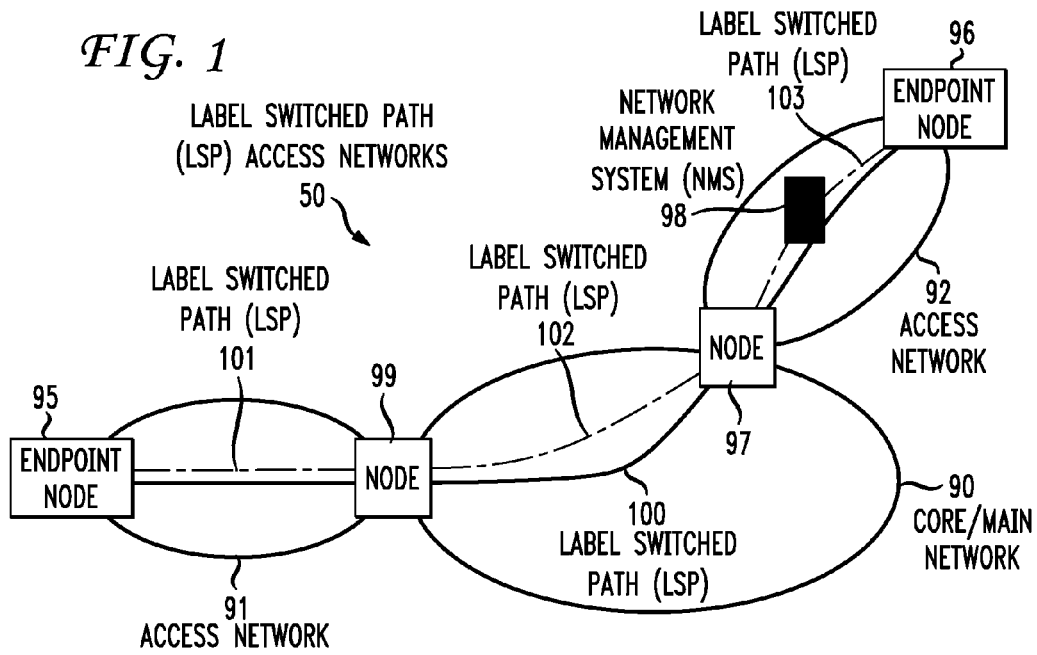
FIG. 1 shows a high level block diagram of a network having two endpoints in accordance with an embodiment of the invention.

FIG. 1 shows a block diagram of an LSP across networks 50. A core network, or main network, 90 includes nodes (e.g., router or switch) 97, 99. The nodes 97, 99 can execute the full suite of MPLS for routing. The nodes 97, 99 also have inter-working protocol capabilities in order to communicate with routers outside of the core network 90.

Endpoint node 95 (i.e., first endpoint 95) is positioned in a first customer premises location and endpoint node 96 (i.e., second endpoint 96) is positioned in a second customer premises location. These endpoint nodes cannot execute the full suite of functions associated with MPLS (i.e., or a first protocol). The first endpoint 95 communicates with the router 99 via an access network 91. Similarly, the second endpoint 96 communicates with the router 97 via access network 92. Each access network 91, 92 is the part of the network 50 that connects the customer equipment (e.g., router 95) to the customer's network provider or ISP (e.g., router 99).

Figure 2:
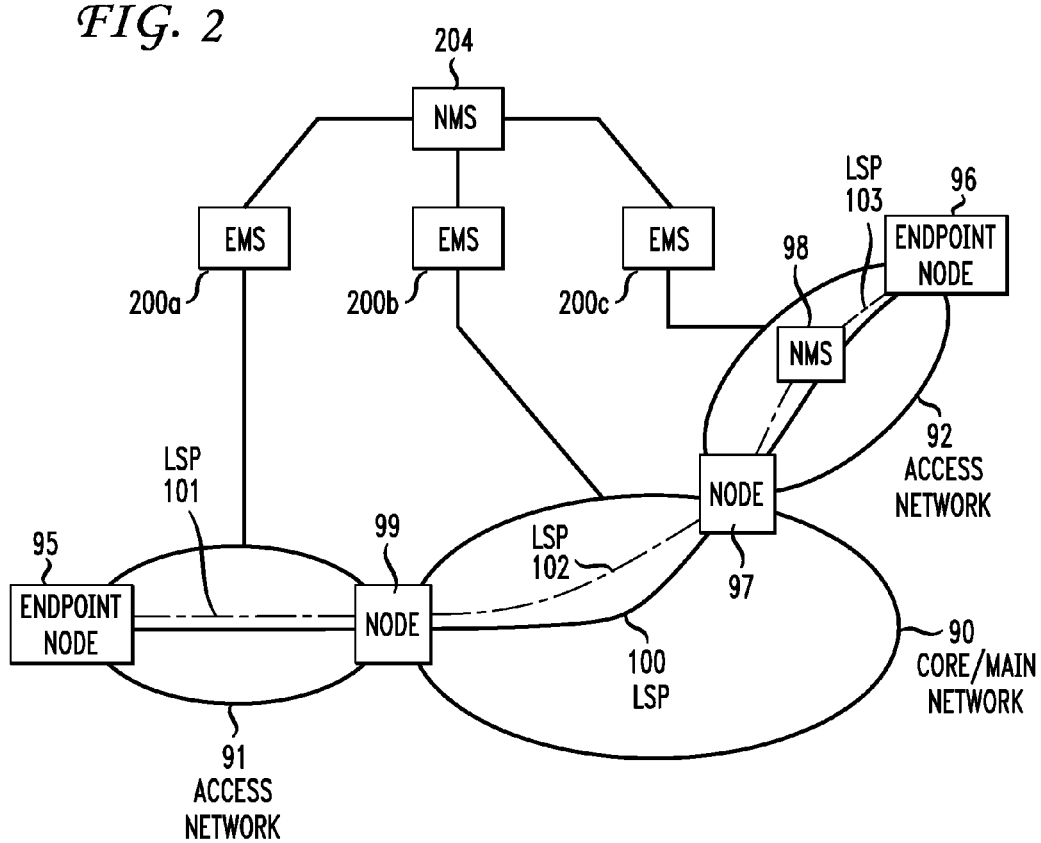
FIG. 2 shows a high level block diagram of the network with Element Management Systems and a Network Management System in accordance with an embodiment of the invention.

Referring to FIG. 2, one or more Element Management Systems (EMSes) 200a, 200b, 200c (generally 200) manage the routers in one or more networks. Each EMS 200 is a device that is generally connected to the routers (or switches) of one (or more) IP network(s). The EMS 200 provides a graphical user interface (GUI) of the network to one or more network administrators and displays the network and its associated routers, shelves, bays, circuits, etc. to the network administrators. The EMS 200 can also perform fault management and performance management. The EMS 200 is used for downloading software to the routers and for backup of critical data. Each EMS 200 communicates with a Network Management System (NMS) 204 (also referred to as an Operations Support System (OSS)). The NMS 204 provisions the various circuit segments and the interfaces between the various segments. In one embodiment, the NMS 204 has independent systems for provisioning, inventory, maintenance, and billing. The provisioning and inventory systems may contain a database of all network facilities, such as the network's routers, ports, links between routers, etc. In some embodiments, the NMS 204 is another EMS 200. The NMS 204 may also partially replace the EMSes 200, performing some of its functionality as well as some of the functionality performed by each EMS 200.

The NMS 204 is the system typically used by the network provider to set up the connection between the customer endpoints. To this end, the NMS 204 sends out provisioning commands to the network devices. Often these commands flow to the routers via the respective EMSes 200. The EMSes 200 may also act on the provisioning commands and send a modified set of commands to the routers. Prior to the availability of network inter-working protocols, each segment of the connection was set up independently by NMS 204, and the various inter-connection points were manually cabled together at the various locations under the direction of the NMS 204. This last manual aspect significantly increased the time it took to set up a complete connection.

With the advent of inter-working protocols, the devices at the interconnection points can communicate with each other making it possible for provisioning commands to flow from one network to another. This makes it possible to set up the entire connection, spanning more than one network, in one provisioning step without any intermediate manual cabling tasks. The traditional way to set up an LSP requires at least one endpoint of the LSP to be able to execute a full set of MPLS functions. This is often not the case, particularly so when the endpoints are in customer locations.

A set of associations, or links, are created in NMS 204. Every network device or customer premise device that is incapable of executing the full MPLS functionality is linked to one or more network devices with full MPLS functionality. Each associated device is capable of setting up an LSP to any other point in this network and across other networks.

Figure 3:
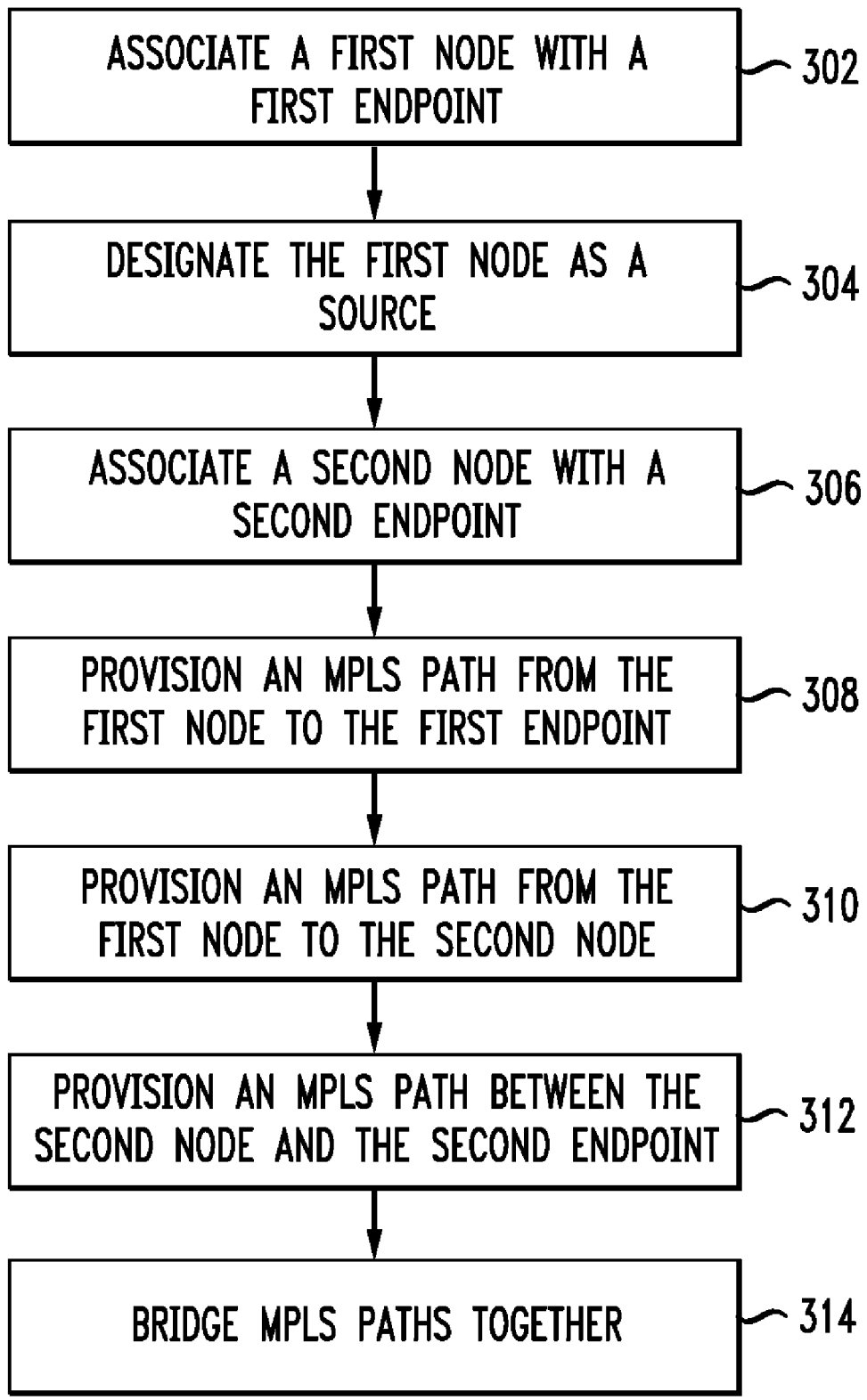
FIG. 3 is a flowchart showing the steps performed by the Network Management System and first and second nodes to provision a label switched path between the two endpoints of the network in accordance with an embodiment of the invention.

FIG. 3 shows a flowchart illustrating the steps performed to provision an LSP across endpoints 95, 96. The NMS 204 first associates the first node 99 with the first endpoint 95 in step 302. The NMS 204 then designates the first node 99 as the source of the LSP in step 304.

The association may be based on one or more rules, such as rules relating to the physical location of the nodes. For example, the first node 99 is associated with the first endpoint 95 because the first node 99 is the closest router to the first endpoint 95 that can communicate via the full suite of MPLS. The rule could also be based geographically on where the LSP is to be routed. For example, there could be one associated node for an LSP from the domestic US network to Europe and another for an LSP to Canada. The rule could also be to match the endpoint device with a node having a device from the same vendor of communication equipment.

The NMS 204 also associates a second node 98 with the second endpoint 96 in step 306. This association with the second endpoint 96 may be based on the same criteria as the first association (e.g., router closest to the second endpoint 96 that can communicate using the full suite of MPLS) or may be based on different criteria. The second node 98 is described above as being associated with the second endpoint 96 because of its physical location in relation to the second endpoint 96. Further, the associations do not have to be one to one. For example, the second node 98 may be associated with multiple endpoints of different paths. The second node may be in the same network as the second endpoint or in a different network. It is not necessary to always associate a first node and a second node. For example, if the second endpoint is capable of full MPSL functionality then the second association is not needed.

In one embodiment, the second node 98 is also designated as a destination node. The NMS 204 then transmits a provisioning message to the source node via the EMS 200 corresponding to the source (e.g., EMS 200b). As described in more detail below, the message includes identifiers for the two endpoints 95, 96 as well as an identifier for the destination node (i.e., second node 98) associated with the destination endpoint (i.e., the second endpoint 96).

The source node 99 provisions the LSP between the endpoints 95, 96 in three steps. First, the source node 99 sets up a first LSP 101 between the first endpoint 95 and the source node 99 in step 308. Next, the source 99 provisions a second LSP 102 between the source 99 and the second node 98 in step 310. The source node 99 also bridges, or enables communication between, the two LSPs 101 and 102. The source 99 then transmits a message to the second node 98 requesting the provisioning of a third LSP 103 between the second node 98 and the second endpoint 96 in step 312. The message also requests the second node 98 to bridge the second LSP 102 and the third LSP 103. The bridging of the LSPs 102, 103 enables data to flow between the two LSPs 102, 103. The source node 99 has therefore set up an LSP across multiple networks by provisioning and bridging, in step 314, multiple LSPs together (i.e., LSP 101, 102, and 103). The source 99 provisions an LSP using information collected by its routing protocol (e.g., Border Gateway Protocol, Open Shortest Path First Protocol), such as the topology of the entire network and all reachable destination addresses.

Moreover, although described above and below with respect to the source node 99, the description equally applies to the destination node 98. In other words, the second node 98 could instead be designated as the source node and the first node 99 could be designated as the destination node.

Figure 4:
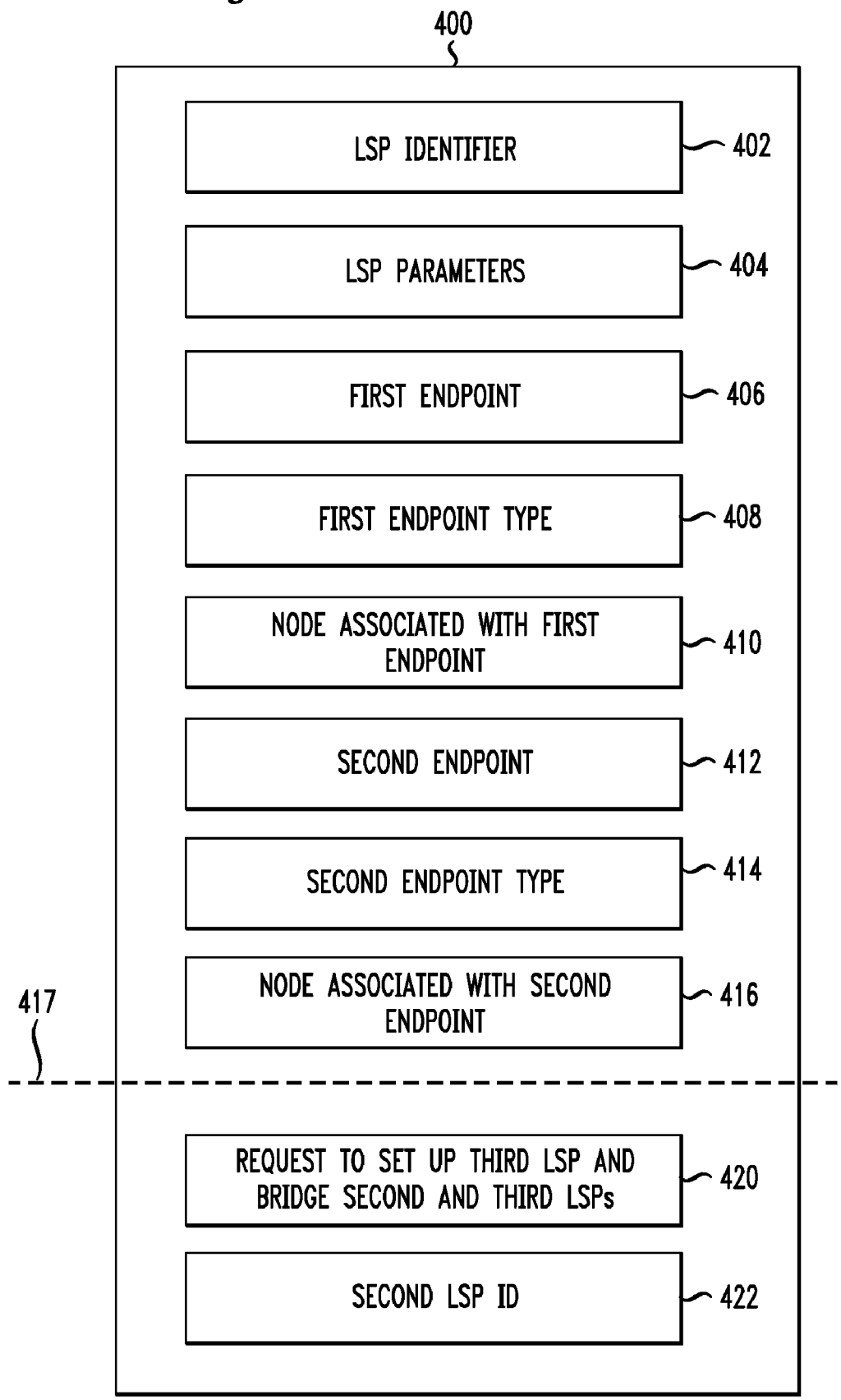
FIG. 4 is a high level block diagram of a message transmitted between nodes in the network to provision the label switched path in accordance with an embodiment of the invention.

FIG. 4 is a block diagram of an embodiment of a provisioning command or message 400 transmitted from the NMS 204 to the source 99 and then from the source 99 to the second node 98 to request the provisioning of the third LSP 103. The message sent from the NMS 204 to the source 99 includes fields 402 through 416 (i.e., above the dashed line 417). The message sent from the source 99 to the second node 98 includes the fields above dashed line 417 as well as the fields 418 through 422 below the dashed line 417.

In more detail, the message 400 includes an LSP identifier 402 (e.g., LSP 100) to identify the LSP that is being provisioned. The message 400 can also include LSP parameters 404, such as the bandwidth needed for the LSP, the maximum latency allowed, etc. The message 400 also includes an identifier 406 for the first endpoint 95 and the type 408 of the first endpoint 95. The type 408 of the first endpoint 95 identifies whether the first endpoint 95 is capable of executing the full suite of MPLS and network inter-working protocols. The type 408 may be a flag to indicate whether the endpoint 95 can handle the MPLS protocol. Alternatively, the type 408 may be a symbol or drawing depicting whether the endpoint 95 can handle the MPLS protocol. The message 400 can also include an identifier 410 of the node 99 associated with the first endpoint 95.

The message 400 also includes the same fields 412-416 for the second endpoint 96, such as an identifier 412 for the second endpoint 96, a type 414 of the second endpoint 96, and an identifier for the node 98 associated with the second endpoint 96.

To provision LSP 103, the source 99 transmits a separate message to the destination node 98 having the fields above and below the dashed line 417. The message 400 may include a request 420 to set up the third LSP 103 and to bridge the second LSP 102 and the third LSP 103. This request 420 may be, for example, a flag. The message 400 additionally includes an identifier 422 for the second LSP 102. Although shown in a single message, any number of the fields 402-422 may be transmitted in any number of messages.

The functions of the nodes, endpoints, EMSes, and NMSes and elements of the network described above may be implemented by one or more computers executing appropriate computer program code. The computer program code may be stored in a storage device and loaded into memory when execution of the computer program code is desired. Thus, the computer operation will be defined by computer program code stored in memory and/or storage and the computer will be controlled by one or more processors executing the computer program code. The computer also includes one or more network interfaces for communicating with other devices via a network.

For example, each node (e.g., the source node 99) may include one or more interfaces for transmitting and receiving messages such as message 400 described above. Each node may further include one or more processors to execute the functionality described above. One skilled in the art will recognize that an implementation of an actual computer will contain other components as well.

Although described above with respect to IP networks running the MPLS protocol, the present invention also applies to Optical networks (e.g., Synchronous Optical Network switches, or SONET), Asynchronous Transfer Mode (ATM) networks, etc. that run either variants of the MPLS protocol or some other protocol with equivalent functionality. These networks have virtual circuits or Time Division Multiplexing (TDM) circuits that are akin to LSPs. Further, the present invention may be used with multiple networks running different protocols so long as the network inter-working functionality can translate instructions from one protocol to another.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

The invention claimed is:

1. A method for provisioning a label switched path between a first endpoint and a second endpoint, the first endpoint and the second endpoint executing a first set of MPLS functions, the method comprising:
   associating a first node with the first endpoint and a second node with the second endpoint based on an association rule relating to the first node being able to communicate using a full suite of MPLS functions and being closest to a physical location of the first endpoint, the second node able to communicate using the full suite of MPLS functions, wherein the full suite of MPLS functions comprises the first set of MPLS functions and a second set of MPLS functions not included in the first set of MPLS functions;
   provisioning, by the first node, a first MPLS path between the first node and the first endpoint;
   provisioning, by the first node, a second MPLS path between the first node and the second node; and
   provisioning, by the second node, a third MPLS path between the second node and the second endpoint, the third MPLS path being a different MPLS path from the first MPLS path.

2. The method of claim 1 further comprising bridging the first MPLS path and the second MPLS path.

3. The method of claim 1 further comprising bridging the second MPLS path and the third MPLS path.

4. The method of claim 1 wherein the provisioning of the third MPLS path further comprises transmitting a message originating at the first node and requesting the second node to provision the third MPLS path.

5. The method of claim 3 wherein the bridging of the second MPLS path and the third MPLS path further comprises requesting, by the first node, the second node to bridge the second MPLS path and the third MPLS path.

6. The method of claim 1 further comprising designating the second node as a destination node.

7. The method of claim 1 wherein the provisioning of the first MPLS path and the second MPLS path and the third MPLS path further comprises receiving, at the first node, a message to provision the first MPLS path and the second MPLS path and the third MPLS path.

8. The method of claim 1 further comprising designating the first node as a source.

9. A system for provisioning a label switched path between a first endpoint and a second endpoint, the first endpoint and the second endpoint executing a first set of MPLS functions, comprising:
   means for associating a first node with the first endpoint and a second node with the second endpoint based on an association rule relating to the first node being able to communicate using a full suite of MPLS functions and being closest to a physical location of the first endpoint, the second node able to communicate using the full suite of MPLS functions, wherein the full suite of MPLS functions comprises the first set of MPLS functions and a second set of MPLS functions not included in the first set of MPLS functions;
   means for provisioning, by the first node, a first MPLS path between the first node and the first endpoint;
   means for provisioning, by the first node, a second MPLS path between the first node and the second node; and
   means for provisioning, by the second node, a third MPLS path between the second node and the second endpoint, the third MPLS path being a different MPLS path from the first MPLS path.

10. The system of claim 9 further comprising means for bridging the first MPLS path and the second MPLS path.

11. The system of claim 9 further comprising means for bridging the second MPLS path and the third MPLS path.

12. The system of claim 9 wherein the means for provisioning the third MPLS path further comprises means for transmitting a message originating at the first node and requesting the second node to provision the third MPLS path.

13. The system of claim 11 wherein the means for bridging the second MPLS path and the third MPLS path further comprises means for requesting, by the first node, the second node to bridge the second MPLS path and the third MPLS path.

14. The system of claim 9 further comprising means for designating the second node as a destination node.

15. The system of claim 9 wherein the means for provisioning the first MPLS path and the second MPLS path and the third path further comprises means for receiving, at the first node, a message to provision the first MPLS path and the second MPLS path and the third path.

16. The system of claim 9 further comprising means for designating the first node as a source.

* * * * *